(No Model.) 3 Sheets—Sheet 1.
E. A. NEWMAN.
ANTI FREEZING APPARATUS FOR WATER PIPES.
No. 360,106. Patented Mar. 29, 1887.
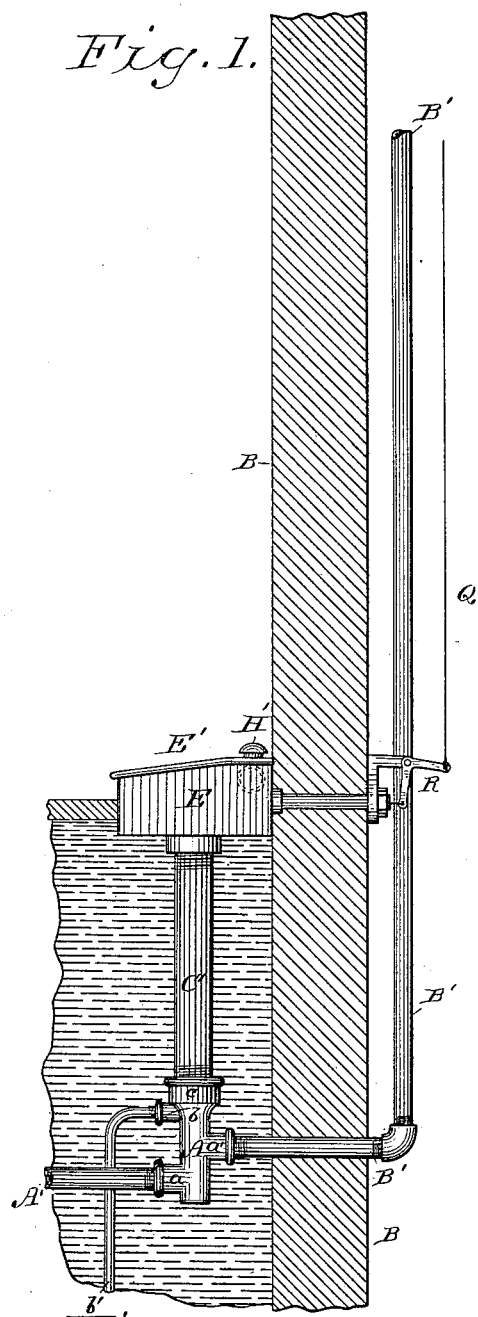
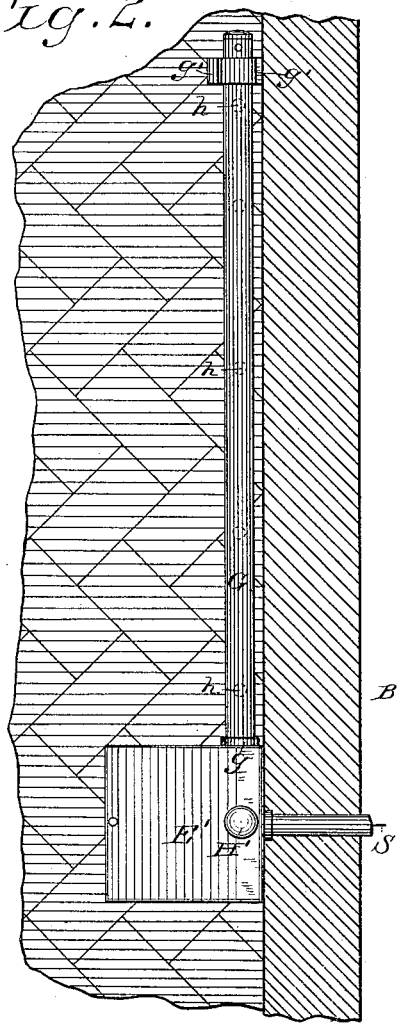
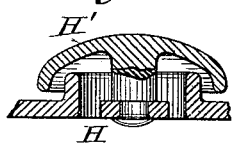
Witnesses
Al. C. Newman
E. M. Newman
Inventor
Edwin A. Newman
By his Attorneys (No Model.) 3 Sheets—Sheet 2.

E. A. NEWMAN.
ANTI FREEZING APPARATUS FOR WATER PIPES.

No. 360,106. Patented Mar. 29, 1887.

Witnesses
Inventor
Edwin A. Newman,
By his Attorneys (No Model.) 3 Sheets—Sheet 3.
E. A. NEWMAN.
ANTI FREEZING APPARATUS FOR WATER PIPES.
No. 360,106. Patented Mar. 29, 1887.
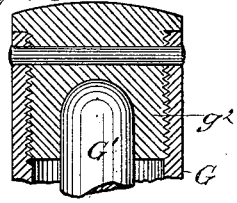
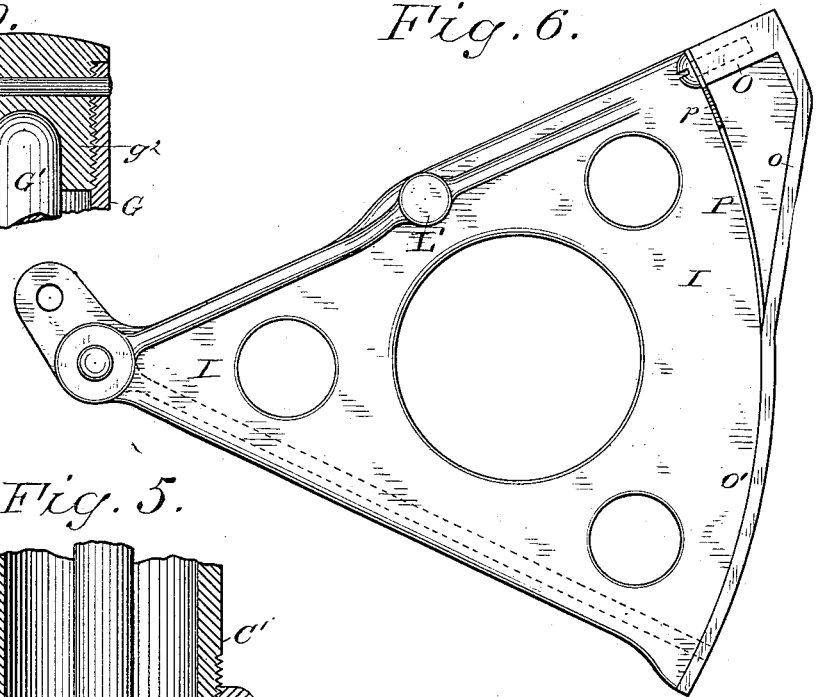
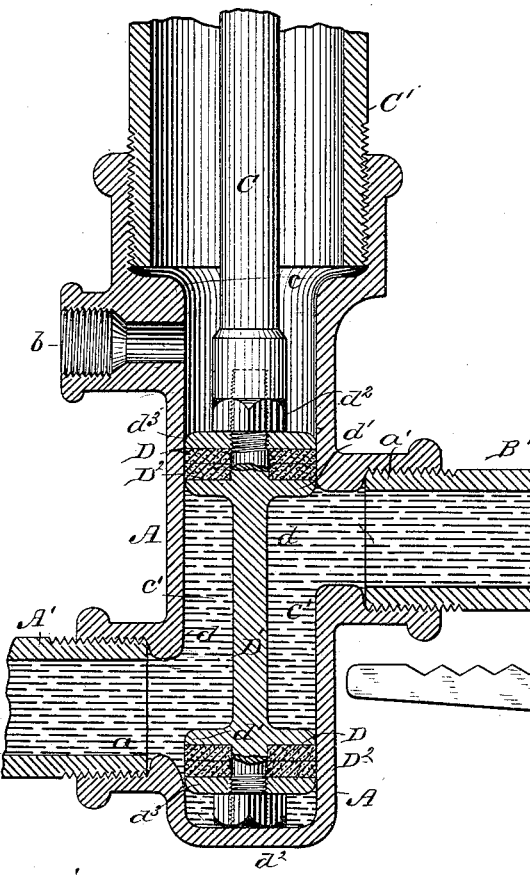
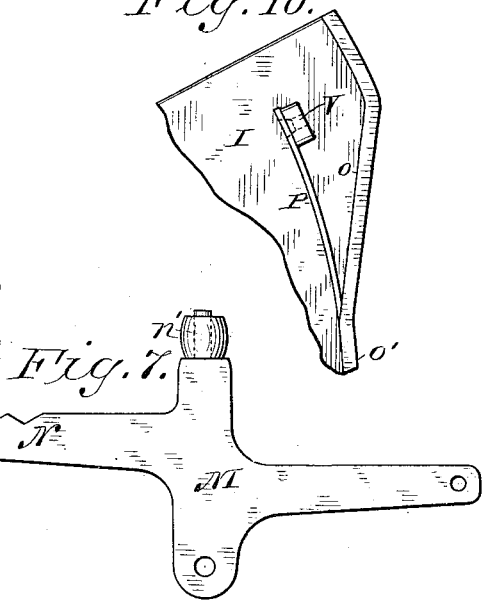
Witnesses
A. C. Newman
C. M. Newman
Inventor
Edwin A. Newman
By his Attorneys
Baldwin Hopkins & Peyton

UNITED STATES PATENT OFFICE.

EDWIN A. NEWMAN, OF WASHINGTON, DISTRICT OF COLUMBIA, ASSIGNOR OF ONE-FOURTH TO DAVID L. SNEDIKER, OF EMPORIA, KANSAS.

ANTI-FREEZING APPARATUS FOR WATER-PIPES.

SPECIFICATION forming part of Letters Patent No. 360,106, dated March 29, 1887.

Application filed August 7, 1886. Serial No. 210,373. (No model.)

*To all whom it may concern:*

Be it known that I, EDWIN A. NEWMAN, of Washington, District of Columbia, have invented certain new and useful Improvements in Anti-Freezing Apparatus for Water-Pipes, of which the following is a specification.

My invention relates to improvements in that class of apparatus for preventing the freezing of water in pipes in which thermostats are employed to automatically actuate mechanism for cutting off the supply of water to the pipes when liable to freeze. United States Letters Patent No. 346,308, dated July 27, 1886, show improvements made by me in this class of apparatus.

By my present improvements I seek to attain the general results designed to be accomplished in accordance with my said patented improvements by the employment of mechanism differing in essential respects therefrom, my object mainly being to improve the valve and its actuating mechanism by which to cut off and open communication between the source of supply of the water and the pipes to be protected against freezing, to provide for ready access to the actuating mechanism without interfering with the valve, and to provide for conveniently locating the apparatus by adapting it to occupy but slight vertical space.

The subject-matter deemed novel will be pointed out by the claims after describing, by the aid of the accompanying drawings, a suitable organization of mechanism for carrying out my invention.

Figure 3:
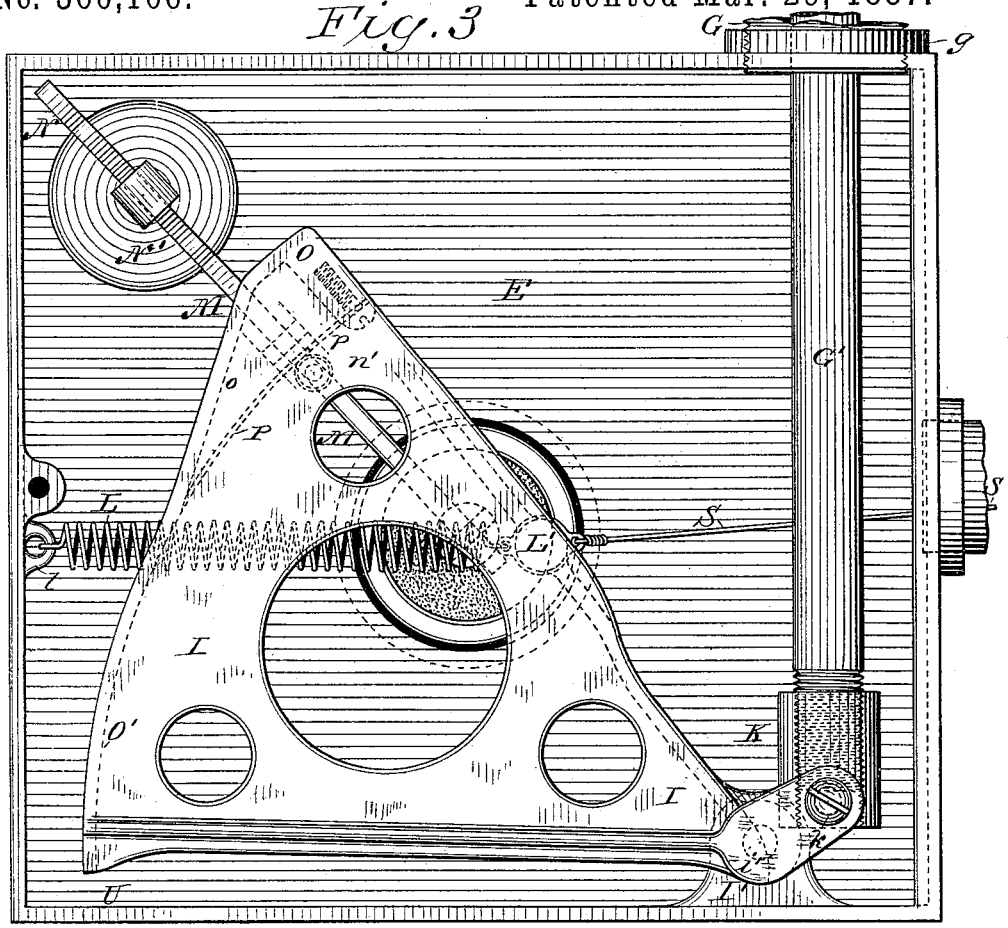
Figure 4:
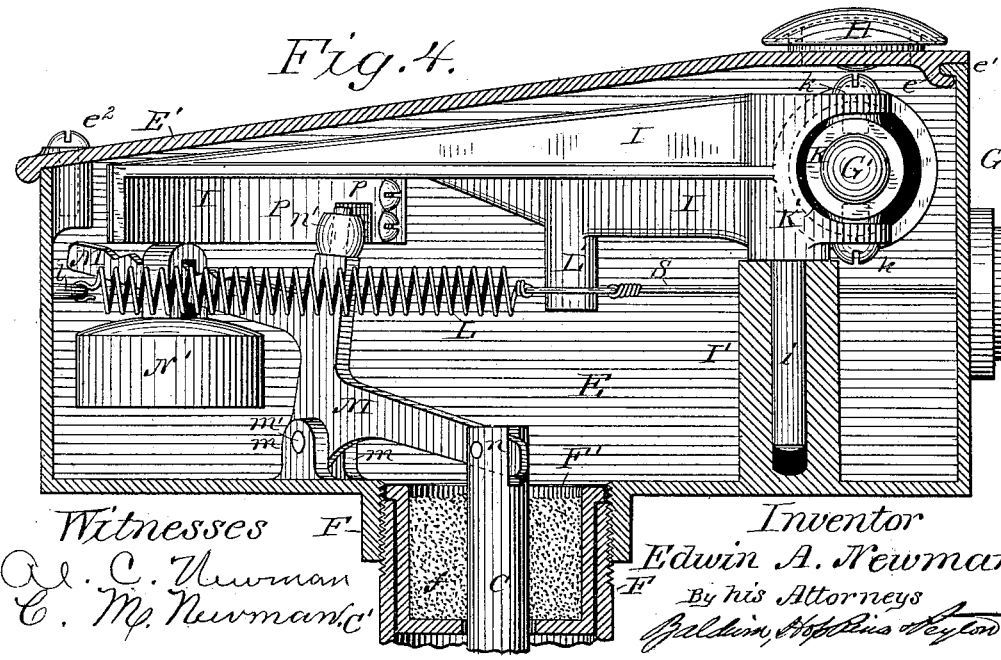

Figure 1 is a view partly in elevation and partly in section. Fig. 2 is a plan view, the wall of the building being in section. Fig. 3 is a plan view showing the valve-actuating mechanism and its casing with the cover removed. Fig. 4 is a view, partly in elevation and partly in section, showing the valve-actuating mechanism, its casing, and portions of the valve-stem and its casing. Fig. 5 shows in vertical section the valve casing and valve and parts of the valve-stem and its casing. Fig. 6 is a bottom view of the controlling-lever of the valve-actuating mechanism. Fig. 7 is a view in elevation of the valve-actuating lever. Fig. 8 shows in section a portion of the cover of the casing for the valve-actuating mechanism. Fig. 9 shows in section the outer end of the thermostatic casing with its cap-nut. Fig. 10 is a bottom view of a portion of a controlling-lever of slightly-modified construction.

In applying my improvements, as in this instance shown, the valve-casing A is buried in the ground close to the wall B of a building to be supplied with water, and the water passes from the source of supply by way of the pipe A' to the valve-casing, with the inlet-opening $a$ of which the supply-pipe connects. The water issues from the valve-casing by the outlet-opening $a'$, which connects with the main service-pipe B' of the building. The valve-casing is provided with a waste-opening, $b$, with which the waste-pipe $b'$ connects, and with an opening, $c$, for the valve-operating rod or stem C, which opening also serves to couple a tube, C', constituting a casing for the valve-stem. The inlet, outlet, and waste openings are all formed in the sides of the valve-casing, and the valve-chamber $c'$, except where enlarged by these openings, is of circular cross-section and uniform transverse area throughout its length.

As shown, only that portion of the valve-casing which constitutes the valve-chamber or is occupied by the valve in its movement is made of uniform cylindrical outline, (excepting at the side openings;) but obviously the valve-stem casing might be coupled to the top of the valve-casing outside instead of inside, and thus render unnecessary the enlargement of the upper end of the casing above the valve-chamber, and the valve-casing, instead of being rounded at its lower end, may be formed with a flat bottom, or this end be closed by a screw-plug or cap-nut, instead of being solid, as shown. If preferred, especially when the valve-casing is made open at its lower end, so as to be closed by a plug or nut, the valve-casing and the valve-stem casing may be made in one piece.

The valve reciprocates endwise of its casing, and is formed by two suitably-packed pistons, D D, united with each other by the connecting-rod D'. The distance between the valve-pistons is such that the water-way $d$, formed between them around their connecting-rod, will communicate with the inlet and outlet openings when the valve is at one extreme of its movement, at which time the water-way of the valve does not communicate with the waste-opening, and when the valve is at the extreme of its movement in the opposite direction its water-way opens communication between the outlet and waste openings, while shutting off communication between the inlet and outlet openings, the water-way never being in communication with the inlet and waste opening at the same time.

The details of the valve are as follows: The connecting-rod D' is formed with the two annular collars $d'$ $d'$ near its opposite ends, and beyond these collars the ends of the rod are threaded and provided with the nuts $d^2$ $d^2$ and washers $d^3$ $d^3$, corresponding with the collars $d'$ $d'$. Packing-rings $D^2$ $D^2$, of leather or its equivalent, are interposed between the collars and washers, and clamped in place by the nuts $d^2$ $d^2$ to make a close fit of the valve-pistons in their casing. The valve-stem is coupled to the valve by screwing it to the upper end of the connecting-rod, as will be obvious.

The valve stem casing C' connects at its upper end with a box-like casing, E, containing the valve-actuating mechanism, and shown as embedded or partially buried in the ground. This casing E is provided with an inclined cover, E', which may be hinged in place, if preferred, but is shown as detachably secured in place by a hook-like lug, $e$, upon its under surface, engaging a flange, $e'$, of the casing, and by a screw, $e^2$, passing through the cover and into the casing. The valve-stem casing connects with the bottom of the casing for the valve actuating mechanism by the coupling-opening F, and the valve-stem projects into the casing of the valve-actuating mechanism by way of its coupling-opening. In order to prevent access of cold air to the valve-stem casing, a flanged packing thimble or gland, F', is provided in the upper end of this casing, through which the valve-stem passes, and in which is placed suitable packing, $f$, about the valve-stem.

The thermostatic apparatus consists of the metallic casing G and the rod G' therein, of a material—zinc or rubber, for instance—which elongates and contracts much more readily than the casing under the influence of changes of temperature. The thermostatic casing connects at its inner end with a coupling-opening, $g$, in the side of the casing for the valve-actuating mechanism, and at its opposite or outer end is suitably supported, as by a bracket, $g'$, secured to the wall B. The thermostatic rod is loosely seated or bears at its outer end against a cap-nut, $g^2$, screwed into the outer end of the thermostatic casing and keyed in place. At its inner end the thermostatic rod projects into the casing of the valve-actuating mechanism and acts upon this mechanism to control the operations of the valve for cutting off and turning on the water. In order to provide for the free admission of air to the thermostatic casing and the circulation of the air through this casing, it is perforated, the perforations $h$ being in its under side to prevent access of water, dirt, &c., and the cover of the casing for the valve-actuating mechanism is formed with the opening H, protected by the hood or cap H'.

A controlling-lever, I, acted upon by the thermostatic apparatus, and forming one of the elements of the valve-actuating mechanism, is pivotally supported near its inner end in its casing E, above the bottom thereof, by means of the downwardly-projecting pivot $i$ of the lever and its receiving-lug I', projecting upwardly from the bottom of the casing. The thermostatic rod acts when extended upon the short arm or inner end of the controlling-lever I to operate this lever for turning on the water, and so long as this rod remains sufficiently elongated the water is kept turned on.

As shown, the inner end of the thermostatic rod is threaded and screws into an internally-threaded sleeve, K, which is jointed to the inner end of the lever by means of pivots $k$ $k$, which secure it in a socket, K', of the lever, loosely embracing it. In this way, it will be seen, the controlling-lever is provided at its inner end with a jointed bearing for the thermostatic rod to admit of the vibratory movements of the lever and the extension and contraction or endwise movements of the rod. The proper adjustment or set of the thermostatic rod is given by turning it in its sleeve K.

The controlling-lever is bent or curved from or near its pivot outward, so that at its outer end it comes nearer that side of the casing at which the thermostatic rod enters than at its inner end, and is much wider at its outer than at its inner end. The lever is operated upon by a spring, which moves it, or acts with a tendency to move it, in the opposite direction to that in which it is moved by the thermostatic apparatus. This spring L is connected at one end to a lug, L', of the lever, and at its other end to a lug, $l$, of the casing E.

A lever, M, for actuating the valve, is constructed and controlled in its movements by the controlling-lever, as next to be described. This valve-actuating lever is of elbow form, and is pivotally supported upon the bottom of the casing E by two lugs, $m$, between which it is jointed by the pivot $m'$. The lower or lateral arm of the lever is jointed by a pivot-pin, $n$, to the upper end of the valve-stem. The upwardly-projecting arm of the lever is provided with the roller $n'$ at its top, and with a side arm, N, projecting from it in a direction the opposite of that in which the lower arm of the lever projects. A valve-counterbalancing weight, N', is adjustably hung upon this side arm, which is provided with a number of notches upon its upper surface, into any one of which a hook or loop for supporting the weight may be adjusted. Obviously a spring might be substituted for the counterbalancing-weight, but the weight is preferable because of the more certain action and the ease with which it may be adjusted.

The controlling-lever is provided at its outer end with a downwardly-projecting flange having at one end a short laterally-extending portion or shoulder, O. The flange for a portion of its length (somewhat less than half its length, as in this instance shown) is slightly inclined inward or toward the pivot of the lever from or near its shoulder toward its opposite end, forming a cam, o, and the remaining portion, O', of the flange is curved concentrically with the pivot of the lever. A spring, P, for acting upon the roller n' of the valve-actuating lever, and having the recess p, is secured at one end to the controlling-lever by way of the flange-shoulder O at a distance from the cam sufficient to provide a space between the fixed end of the spring and the cam wide enough to accommodate the roller of the valve-actuating lever. This controlling-spring converges toward the cam from its fixed end to its free end, normally bears at its free end against the inner end of the cam, and is curved correspondingly with the portion O of the flange, so as to form a continuation thereof concentric with the pivot of the controlling-lever.

From the above description it will be understood that in the operation of the apparatus the thermostatic rod when sufficiently elongated acts upon the controlling-lever so as to hold it against the force exerted by the spring L, and in position for the roller of the valve-actuating lever to bear either upon the concentric portion of the flange of the controlling-lever or upon the outer surface of the controlling-spring P, the water at this time being turned on, and that upon the contraction of the thermostatic rod to a sufficient extent when there is danger of freezing, the spring of the controlling-lever is allowed to act to move this lever into position to present the recess of the controlling-spring P to the roller of the valve-actuating lever, and this roller, by the movement of the valve-actuating lever, is brought by way of the spring-recess to the cam portion of the flange of the controlling-lever, thus moving the valve to cut off the water and open communication between the outlet and waste openings of the valve-casing to drain the main service-pipe of the building and such pipes as may be connected therewith. Upon the movement of the controlling-lever to turn on the water, the roller of the valve-actuating lever passes from the cam and out from the inner side of the spring P, which yields to release the roller.

To provide for temporarily turning on the water by hand, when it has been cut off by the operation of the thermostatic apparatus, and would so remain until the extension of the thermostatic rod to a sufficient extent to automatically turn it on were not some other provision made, the controlling-lever is connected with a pull-wire, Q, which is to be provided with suitable pull-handles arranged adjacent to the cocks with which the main service-pipe and its connecting-pipes may be provided, so that by operating the pull-handle near a cock from which water is wanted the valve will be adjusted to supply the water. As shown, the wire Q is connected with one arm of the bell-crank lever R, the other end of which is connected by the wire S with the stud L' of the controlling-lever. By pulling upon the wire the controlling-lever is moved in opposition to the force exerted upon it by its spring, the valve-actuating lever is moved by the controlling-lever cam, and the roller n' released from the control of the spring P, and the water is turned on. After starting the flow of water through the valve-chamber by turning one of the cocks for drawing water, the pull-handle may be released as the resistance to the upward movement of the valve will be sufficient to prevent such movement while there is a current through the valve-chamber between the valve-pistons. When, however, the cock is closed and the current ceases, the pressure of water upon the valve (beneath both pistons) will be sufficient, aided by the counterbalancing-weight of the valve-actuating lever, to move this lever to bring its upper end against the cam-flange of the controlling-lever and shut off the water, the controlling-lever when the pull-handle was released having been restored to the position into which its spring moves it, so as to abut at its outer end against the side of its casing at U.

Instead of providing the flange-shoulder O and the controlling-spring P, recessed and attached to the controlling-lever by the flange-shoulder, this shoulder may be dispensed with, and an unrecessed controlling-spring be provided and fixed to a downwardly-projecting lug, V, of the controlling-lever. (See Fig. 10.) The roller of the valve-actuating lever would pass to the cam-flange beyond the fixed end of the spring, in accordance with this modification.

By my improvements it will be seen that the valve-actuating mechanism is thoroughly protected; that ready access may be had to it without disturbing the valve; that the casing for this mechanism may be located close to the building in connection with which it is used and in a space of slight vertical dimension—as, for instance—beneath the sill of a low window, under steps, &c., and that the valve is durable and simple in construction and efficient in operation.

I claim as of my own invention—

1. The combination of the valve-casing having the inlet, outlet, waste, and valve-stem openings, the reciprocating valve formed with the water-way for communicating with the inlet and outlet openings at one extreme of the valve's movement, and with the outlet and waste openings at the other extreme of the valve's movement, the valve-stem projecting at one end into the valve-casing, the valve-stem casing connected at one end with the valve-casing, the valve-actuating mechanism operating upon the valve-stem, the casing for said mechanism into which the valve-stem projects and with which the valve-stem casing is connected, the thermostatic casing connected with the casing for the valve-actuating mechanism, and the thermostatic rod operating upon said mechanism, substantially as and for the purpose set forth.

2. The combination of the thermostatic rod, the thermostatic casing, the casing for the valve-actuating mechanism with which the thermostatic casing is connected, the pivoted controlling-lever acted upon by the thermostatic rod, the spring acting upon the controlling-lever in opposition to the thermostatic rod, the valve-actuating lever controlled in its operations by the controlling-lever, the valve-stem connected with the valve-actuating lever, the valve-casing having the opening for the valve stem, the valve stem casing extending from the valve-casing to the casing for the valve-actuating mechanism, the said valve-casing having inlet, outlet, waste, and valve-stem openings, and the reciprocating valve formed by the pistons, having the water-way between them for communicating with the inlet and outlet openings at one extreme of the valve's movement, and with the outlet and waste openings at the other extreme of the valve's movement, substantially as and for the purpose set forth.

3. The combination of the thermostatic apparatus, the pivoted controlling-lever having at one end the flange, with the cam portion and the concentric portion, and acted upon at its opposite end by the thermostatic apparatus, the spring acting on the controlling-lever in opposition to the thermostatic apparatus, the elbow-like valve actuating lever provided with the counterbalancing-weight and operated upon at one end by the controlling-lever, the controlling-spring of the valve-actuating lever, secured to the controlling-lever, the valve-stem connected with the end of the valve-actuating lever opposite that operated upon by the controlling-lever, the connected valve-pistons having the water-way between them, the valve-casing having the side inlet, outlet, and waste openings and the valve-stem opening, the casing for the valve-actuating mechanism, and the valve-stem casing connected with it and with the valve-casing, substantially as and for the purpose set forth.

4. The combination of the valve-casing having the inlet, outlet, waste, and valve-stem openings, the reciprocating valve formed with the water-way for communicating with the inlet and outlet openings at one extreme of the valve's movement, and with the outlet and waste openings at the other extreme of the valve's movement, the valve-stem projecting at one end into the valve-casing, the valve-stem casing connected at one end with the valve-casing, the valve-actuating mechanism operating upon the valve-stem, the casing for said mechanism, into which the valve-stem projects and with which the valve-stem casing is connected, the thermostatic casing connected with the casing for the valve-actuating mechanism, the thermostatic rod operating upon said mechanism, and the hand-actuated mechanism, also operating upon the valve-actuating mechanism, with which it is connected between the valve-stem and the thermostatic apparatus, the said hand-actuating mechanism consisting, essentially, of the bell-crank lever R, the wire S, and the pull-wire Q, substantially as and for the purpose set forth.

In testimony whereof I have hereunto subscribed my name.

EDWIN A. NEWMAN.

Witnesses:
Jos. FORREST,
R. C. OMOHUNDRO.